United States Patent

Karg et al.

[11] Patent Number: 6,101,923
[45] Date of Patent: Aug. 15, 2000

[54] AUTOMATIC COFFEE MAKER

[75] Inventors: Anton Karg, Ruetihof; Raffaele Puddu, Niederrohrdorf; Fritz Merker, Ruetihof, all of Switzerland

[73] Assignee: Egro AG, Niederrohrdorf, Switzerland

[21] Appl. No.: 09/394,787

[22] Filed: Sep. 13, 1999

Related U.S. Application Data

[63] Continuation of application No. PCT/CH97/00105, Mar. 13, 1997.

[51] Int. Cl.[7] ....................................... A47J 31/40
[52] U.S. Cl. ......................... 99/289 D; 99/291; 99/302 P
[58] Field of Search .............................. 99/289 R, 289 D, 99/289 P, 291, 302 P

[56] References Cited

U.S. PATENT DOCUMENTS

| | | | |
|---|---|---|---|
| 4,681,028 | 7/1987 | Schmed et al. | 99/289 R |
| 4,941,399 | 7/1990 | Zucchetti | 99/289 P |
| 5,551,988 | 9/1996 | Reyhanloo et al. | 134/22.18 |

FOREIGN PATENT DOCUMENTS

| | | |
|---|---|---|
| 0380450 | 8/1990 | European Pat. Off. . |
| 0407365 | 1/1991 | European Pat. Off. . |
| 0486433 | 5/1992 | European Pat. Off. . |
| 1118772 | 6/1956 | France .................. 99/289 D |
| 2663216 | 12/1991 | France . |

*Primary Examiner*—Reginald L. Alexander
*Attorney, Agent, or Firm*—Schweitzer Cornman Gross & Bondell LLP

[57] ABSTRACT

A coffee machine has a low overall height and allows an attractive aesthetic design to be achieved in its execution. A brewing block comprising brewing chambers is guided over a circular path, the chambers adopting three different operating positions. Brewing plungers and straining/expelling plungers move axially in the brewing chambers. Drive and control of the brewing assembly is effected by way of spur gears and cam discs which are housed in two cam disc housings located opposite one another. In accordance with a method according to the invention, the rotation to the three positions takes place in steps of 30 degrees, with resetting taking place through 60 degrees.

10 Claims, 7 Drawing Sheets

AUTOMATIC COFFEE MAKER

This application is a continuation of PCT/CH97/00105, filed Mar. 13, 1997.

The present invention relates to a coffee machine and a method for operating the coffee machine.

BACKGROUND OF THE INVENTION

Coffee machines, also known as coffee-makers, having both at least one brewing chamber and a device for preparing and apportioning coffee powder are particularly used in the restaurant trade. These machines are generally bulky objects, obstruct an unusually large amount of space in the serving area and are often incompatible with modern and attractively designed restaurants. These machines also require a relatively large amount of maintenance and, in the event of breakdowns, cause fairly long service interruptions. Furthermore, the mechanical components thereof, by the nature of the design, are often contaminated with coffee powder and/or escaping water and coffee.

An object of the present invention is therefore to provide a coffee machine whose construction allows a smaller overall height than the prior art and an unobstructed front to provide an aesthetically attractive appearance. The machine should also be easy to operate and maintain. Furthermore, the construction should be such that the coffee machine has no unhygienic spaces where coffee powder and coffee can build up; with appropriate routing of the media contamination is prevented from occurring.

BRIEF DESCRIPTION OF THE INVENTION

According to the invention, the foregoing and other objects are achieved in a coffee machine in which the brewing chamber is recessed in a brewing block which, guided partially over a circular path around a horizontally arranged axis, may be swivelled into a first filling position, then into a second brewing position with hot water feed and coffee discharge, and subsequently into a third compacted coffee grounds-expelling position, and wherein the brewing block indirectly or directly entrains one or more corresponding axially-operated plungers.

The coffee machine of the present invention has the advantage of a compact device which is expediently arranged over a circular path and which, despite the small overall height which it requires, has defined working positions and is kinetically advantageous. It is therefore suitable for high serving outputs, and in particular for continuous service in the restaurant trade.

By indirectly actuating the plungers the movement of the brewing block serves merely as a reference for initiating the plunger strokes.

Preferred embodiments encompass constructions in which the flow of media tales place from the top downwards; however, the media may analogously also he conducted in any other manner if appropriate, for example, to accommodate different serving arrangements.

By arranging the brewing block to be pivotally held between lateral flanges, an economical construction which is clean and hygienic in operation can be achieved. Actuation of the flanges by spur gears can permit a very simple mechanical actuation of the brewing assembly. The inclusion of spur gears and cam discs requires only a central, commercially available drive using a geared motor, which can be fitted outside the brewing assembly. Alternatively individual drive means can be provided.

Incorporation of dual brewing chambers enables two or more cups to be dispensed at the same time in parallel brewing processes. The coordination of two grinding mechanisms with the brewing chambers further can considerably reduce the overall height which the machine requires.

The inclusion of a swivelling funnel can allow the brewing chambers to be arranged in parallel. The chambers can be of different diameters and volumes, enabling several cups of coffee which have the same quality as a single cup to be dispensed at the same time.

BRIEF DESCRIPTION OF THE DRAWINGS

A fuller understanding of the invention will be realized upon consideration of the embodiments of the invention as described in the following detailed description with the aid of the annexed drawings, in which.

In all the Figures, identical parts are provided with the same reference numerals.

DETAILED DESCRIPTION OF THE INVENTION

Figure 1:
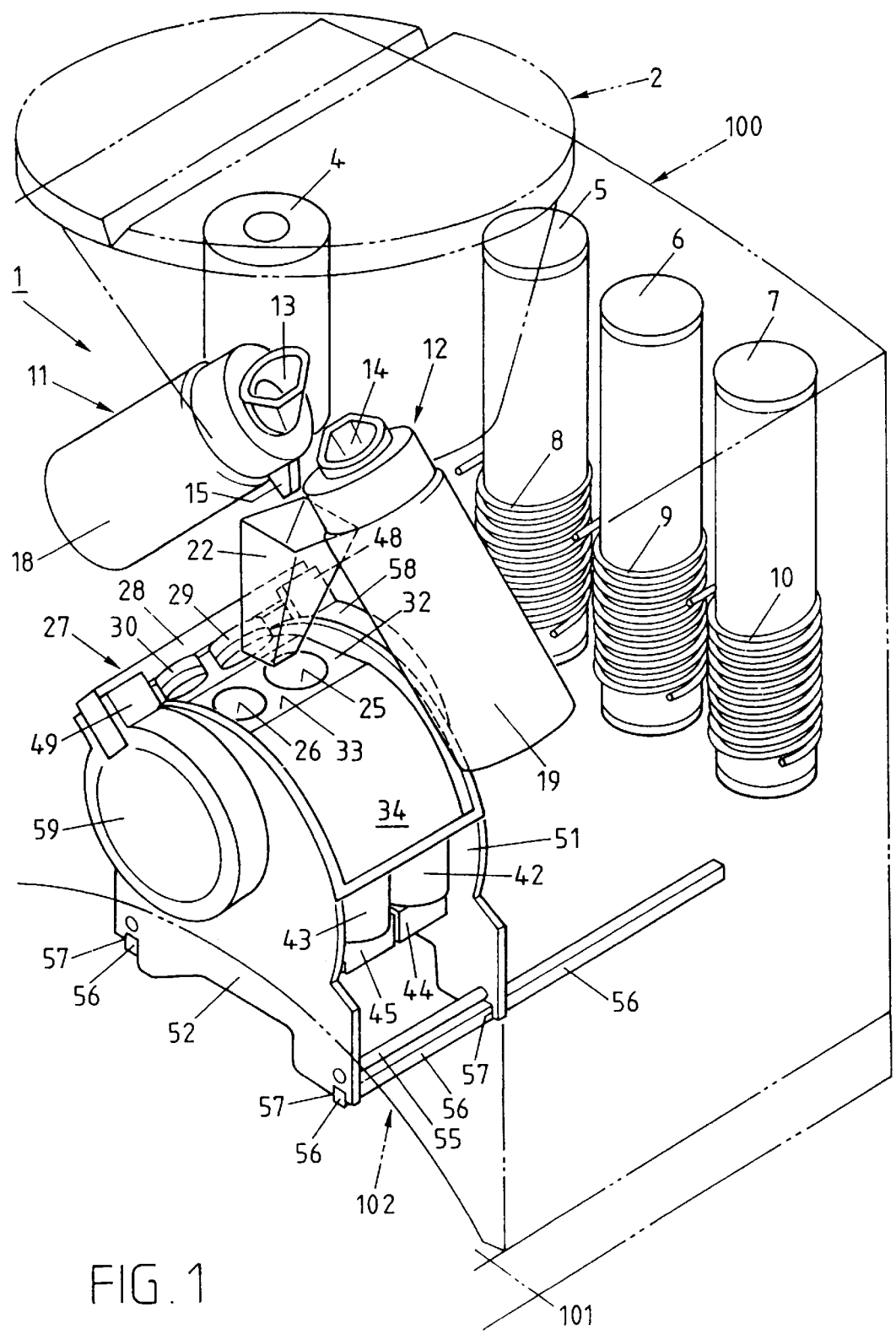
FIG. 1 is a simplified perspective representation of a coffee maker of the present invention.
Figure 3:
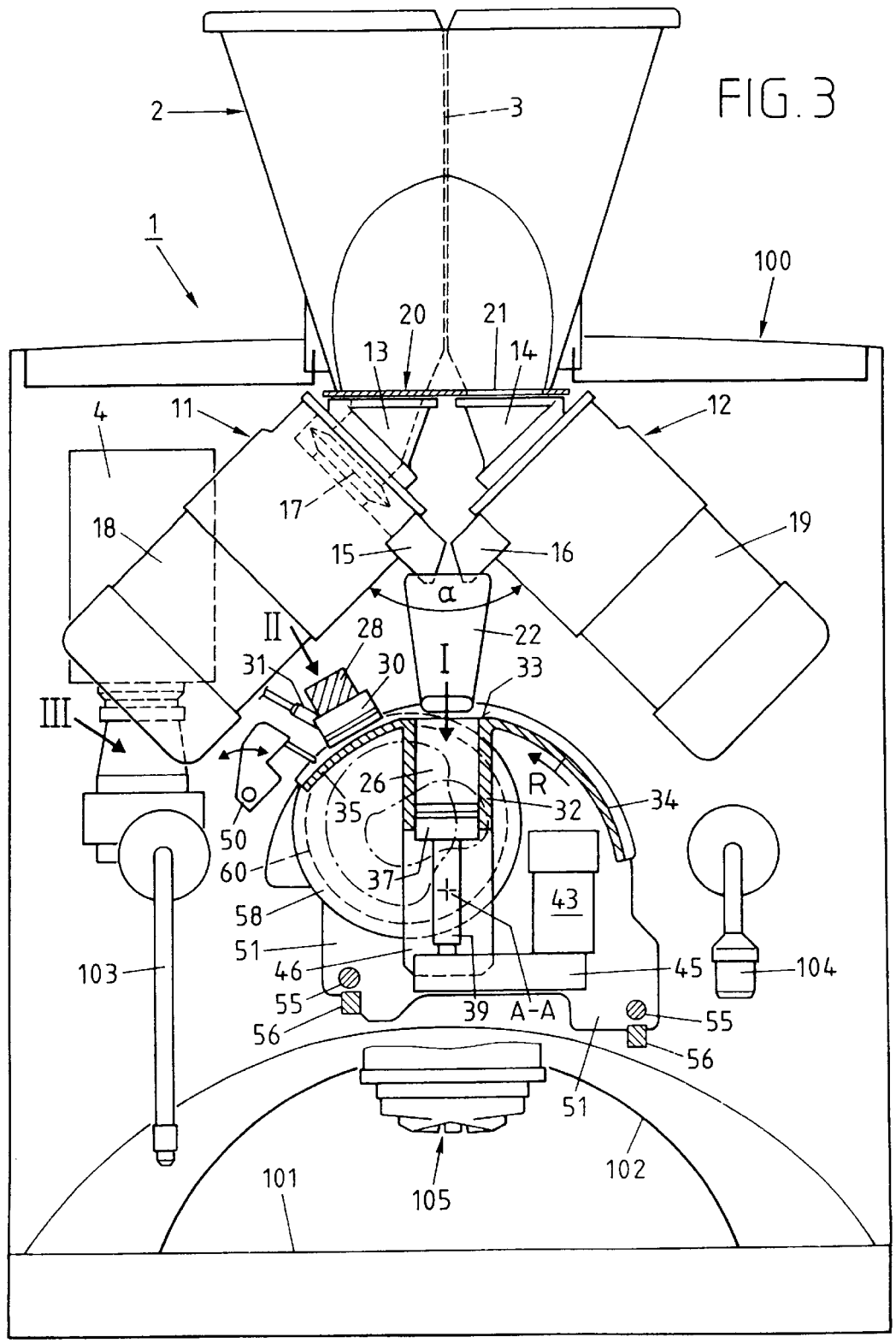
FIG. 3 is a partial sectional front elevation view of the coffee maker of FIG. 1.

With initial reference to the figures, and particularly FIG. 1, inside an appliance housing denoted 100 is a coffee-maker with a brewing assembly 1 with powder preparation means. Coffee beans are poured into a coffee-bean container 2 in a commonly known manner, the container 2 having a partition wall 3 which allows two different brands of coffee to be used. Cf. FIG. 3.

Arranged in the upper region of the appliance housing 100 is a water pump 4, known per se, which feeds boilers 5, 6, 7 which have heating coils 8, 9, 10 wound around them. Coffee grinders 11 and 12 are arranged at an angle of 90° to one another and comprise charging funnels 13, 14, powder discharge outlets 15 and 16, and electric motors 18, 19. Only the powder discharge Outlet 15 is visible in FIG. 1. Between the coffee grinders 11, 12 is a controllable swivelling funnel 22 which selectively supplies freshly ground coffee powder from the grinders into brewing chambers 25 or 26 located therebeneath.

Figure 2:
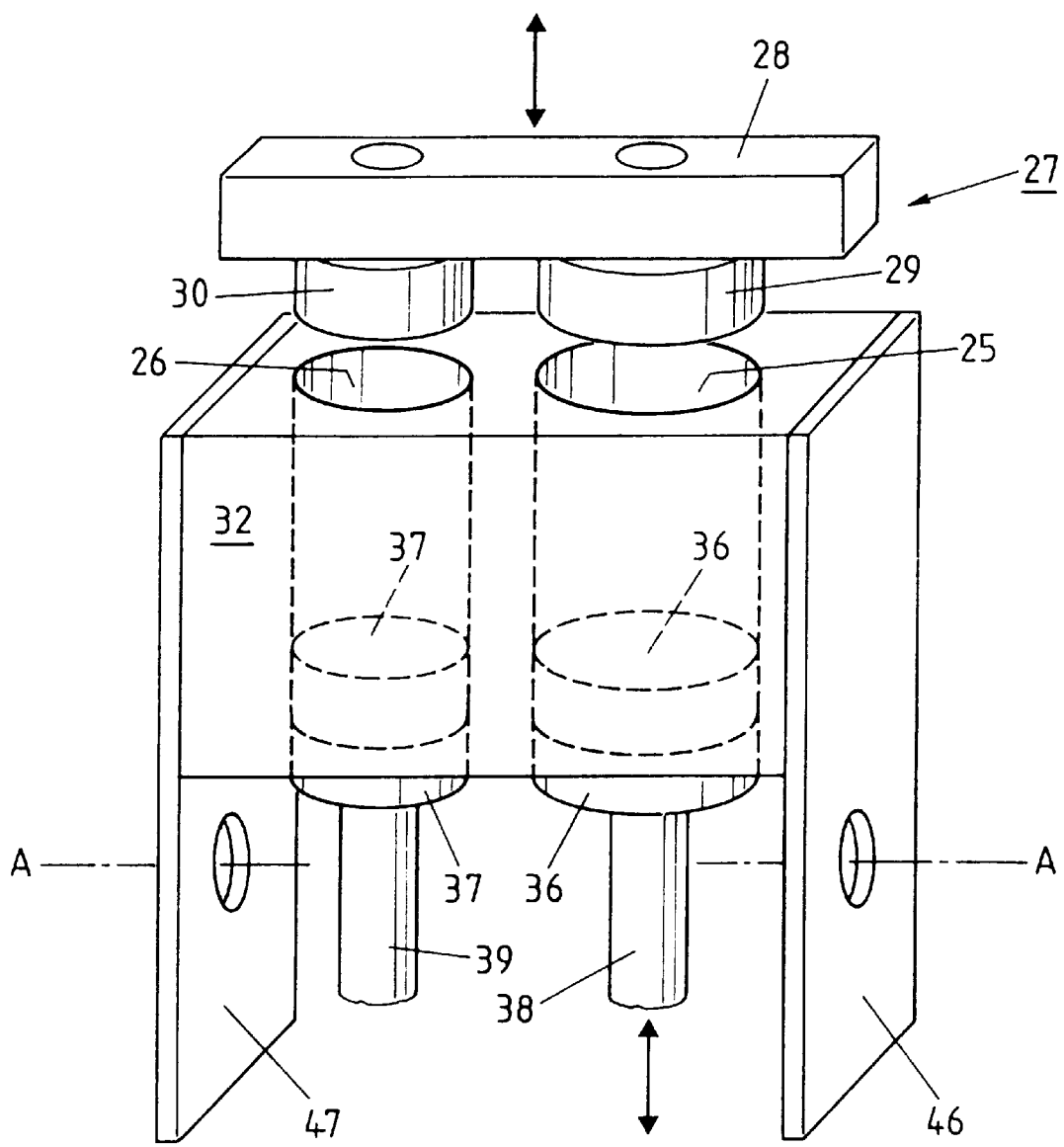
FIG. 2 is a schematic representation of the elements of the brewing assembly according to FIG. 1.

Located in a so-called brewing head 27, detailed in FIG. 2, is a brewing yoke 28 to which one large and one small brewing plunger 29 and 30, respectively are secured. The brewing block 32 is illustrated in FIG. 1 in the filling position with a flat surface 33 in which the aforementioned brewing chambers 25, 26 are accommodated.

A side covering 34 may also he seen, beneath which spindle drives 42 and 43, described below and including gear housings 44 and 45, are located.

The whole brewing assembly is mounted in laminar housing supports 51, 52 which are held by means of spacers 55 which are screwed together. In FIG. 1 the brewing assembly is mounted on two guide rails 56, and may he seen in the pulled-out state. The guide rails 56 fit positively in mutually corresponding recesses 57 in the housing supports 51, 52.

Also evident are cam disc housings 58, 59 which are provided with a yoke guide 49 located on the top thereof.

The appliance housing 100, shown in phantom in FIG. 1, is provided in its lower region with an indicated baseplate 101 comprising a cup rest; between the baseplate and the actual appliance housing 100 is a curved recess 102.

The schematic representation of FIG. 2 is intended to enable the detailed drawings to he more easily understood. It shows the brewing head 27, which may be raised and lowered in the direction of the arrow, with its yoke 28 and the brewing plungers 29 and 30 arranged therebeneath. Within the brewing block 32, axially displaceable straining/expelling plungers 36 and 37 are fitted in the brewing chambers 25 and 26, each plunger rod 38 or 39 having an internal thread. Arranged laterally on the brewing block 32 are flanges 46, 47 which are used to swivel the said block around an axis A—A.

The partial sectional representation of FIG. 3 again shows the appliance housing 100 with its brewing assembly 1 and its device for preparing and apportioning coffee powder. In this Figure a grinding mechanism 17 and a second powder discharge outlet 16, the angle between the electric motors 18, 19 and also the swivel positions I–III of the brewing block 32 can be seen.

The first filling position is denoted I and corresponds to the position represented in FIG. 3. Located at an angle of 30 degrees thereto in the counterclockwise direction is the second so-called brewing position II, while the compacted coffee grounds-expelling position III is located 60 degrees in the counterclockwise direction relative to the starting position (filling position I) on the circular path R.

Also visible is a hot water feed 31 which is connected via valves (not shown) to the boilers 5, 6, 7 (FIG. 1) which in turn discharge into the brewing plunger 30.

It is apparent that the brewing block 32 with its side coverings 34 and 35 is a single-piece construction.

Arranged next to the brewing yoke 28 is a scraper 50 which is pivotable in the direction of the arrow. This is actuated by the rotary movement of the brewing head 27, for which purpose there is provided on the covering 35 an actuating cam—not illustrated for the sake of clarity—which produces rotary movement or tilt in the clockwise direction of the scraper 50 tensioned by a spring (see arrows around the axis of rotation).

In the left-hand part of the appliance housing 100 there is a removable drawer (not represented), arranged in a known manner, for the coffee grounds.

Provided on either side next to the brewing assembly are a hot water outlet 103 and a steam outlet 104 as commonly known.

The coffee grinders 11 and 12 are charged by way of a shut-off disc 20 with two coffee-bean openings 21. The coffee-bean container 2 can be removed from the machine and carried even when filled; to do this, the shut-off disc 20 is rotated so that the coffee-bean openings 21 are closed.

Provided in the center of the curved recess 102, which permits a view through the coffee-maker, are vertically adjustable coffee outlets 105.

Figure 4:
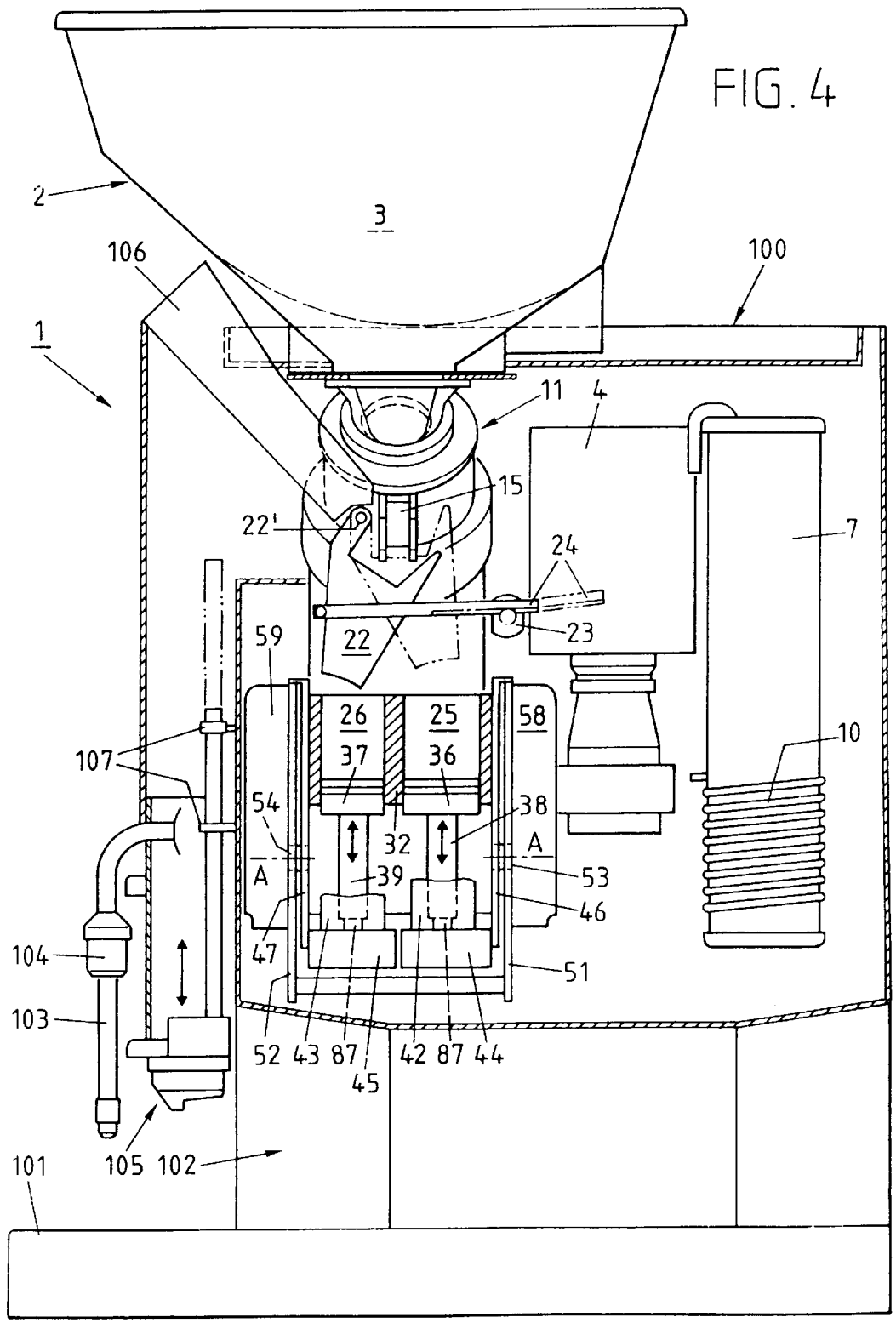
FIG. 4 is a partial sectional side elevation view of the coffee maker of FIG. 1.

The partial sectional representation of FIG. 4 shows further details viewed from the side. It shows, for example, the vertical adjustment option of the coffee outlets 105 by means of guides 107.

The structural association of the flanges 46 and 47 comprising their axle bearings 53, 54 with the brewing block 32 is also apparent. Also evident are the different diameters of the brewing chambers 25 and 26, the larger brewing chamber 25 being used for preparing two cups of coffee at the same time. The necessary selective apportioning of the coffee powder into the brewing chambers 25, 26 is effected by the controllable swivelling funnel 22 which turns around a swivel axis or axle 22' by means of a swivel drive 23 and a rack 24. The swivel drive 23 may include a commercially available electric motor with pinion.

The necessary rotation of the threaded spindles 87 apparent in FIG. 4 for the axial plunger movement is effected by way of the two-gear housings 44 and 45.

Figure 5:
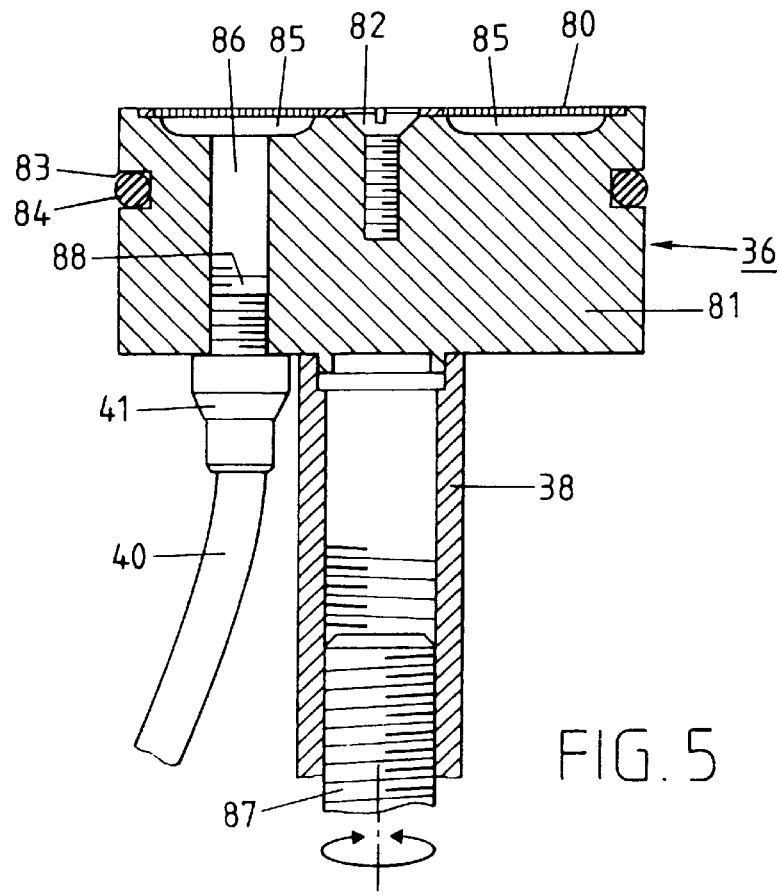
FIG. 5 is a detail view of a straining/expelling plunger according to FIGS. 3 and 4.

The straining/expelling plunger 36 illustrated in FIG. 5 as representative has a strainer plate 80 on its end face which serves as the brewing strainer, also commonly known. It is fixed in a plunger body 81 by means of a central screw fitting 82. Located peripherally in the plunger body 81 is an annular groove 83 in which an annular seal 84, such as Neoprene O-ring, is inserted. Evident beneath the strainer plate 80 is an annular recess 85 which opens into an outlet bore 86 with an internal thread 88 in which is fitted a hose coupling 41 with a hose 40 serving for the coffee outflow.

A plunger rod 38 with an internal thread acts centrally on the plunger body 81; it is driven by the threaded spindle 87 mentioned in connection with FIG. 4.

Figure 6:
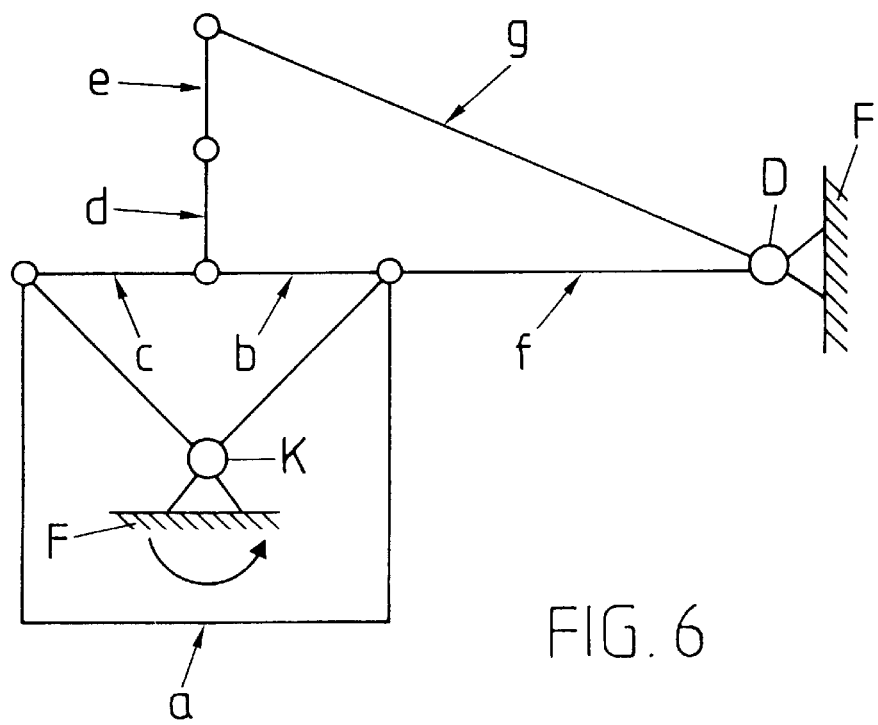
FIG. 6 is a structural diagram of the sequence of movements in the brewing assembly of the coffee maker of FIG. 1.

The kinematics of the sequence of movements may be analyzed with the aid of the structural diagram in FIG. 6. The cams required for a central mechanical drive are symbolized by a single cam disc K; the same applies to the drive D.

According to FIG. 6, first there is a turning movement a of the cam disc, then a first movement b of the brewing block through 30 degrees, a second movement c through 30 degrees, a plunger movement d upwards over a first stage, and a plunger movement e upwards over a second stage. In addition, a drive f of the cam disc K and drives g of the plungers are required.

Figure 7A:
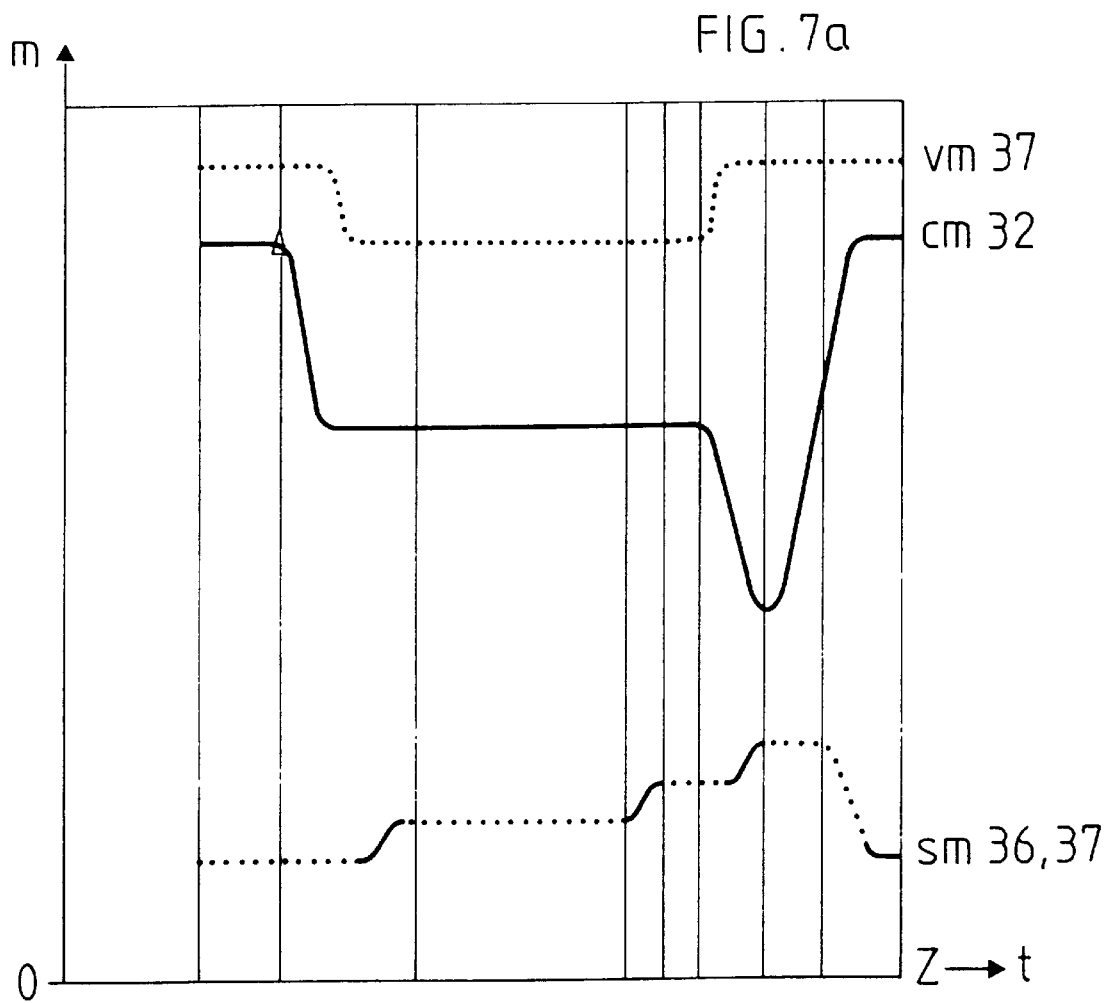
FIG. 7a is a kinematics graph of the movement of the brewing head, the rotation of the brewing block and the stroke movement of the straining/expelling plungers in the brewing block.
Figure 7B:
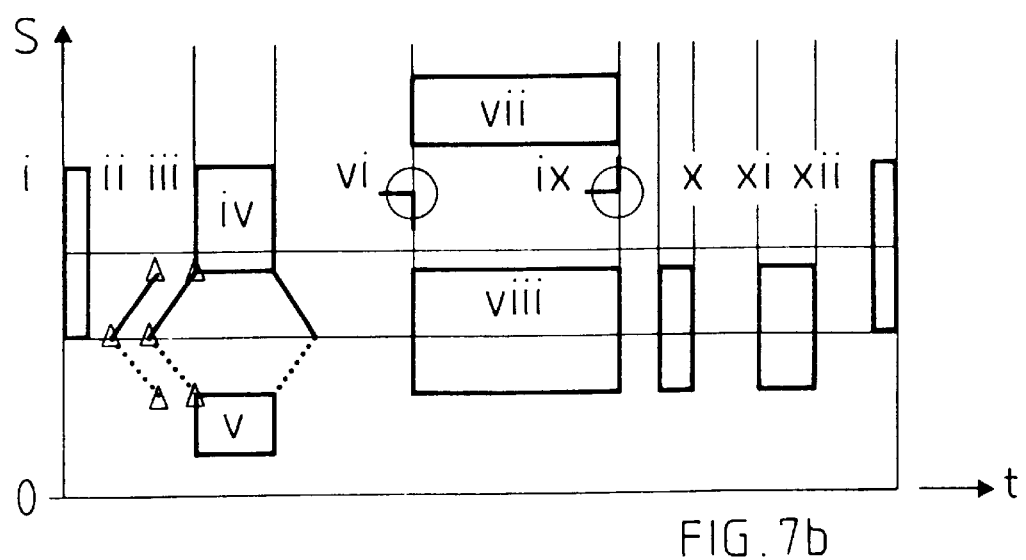
FIG. 7b is a kinematic diagram showing the control and switching functions over the time sequence of the movements of FIG. 7a, and FIGS. 8a and 8b illustrate a preferred variant for implementing the sequences of movements according to FIGS. 7a and b using cam discs and drivers, the figures representing the respective opposite sides of a spur gear.
Figure 8B:
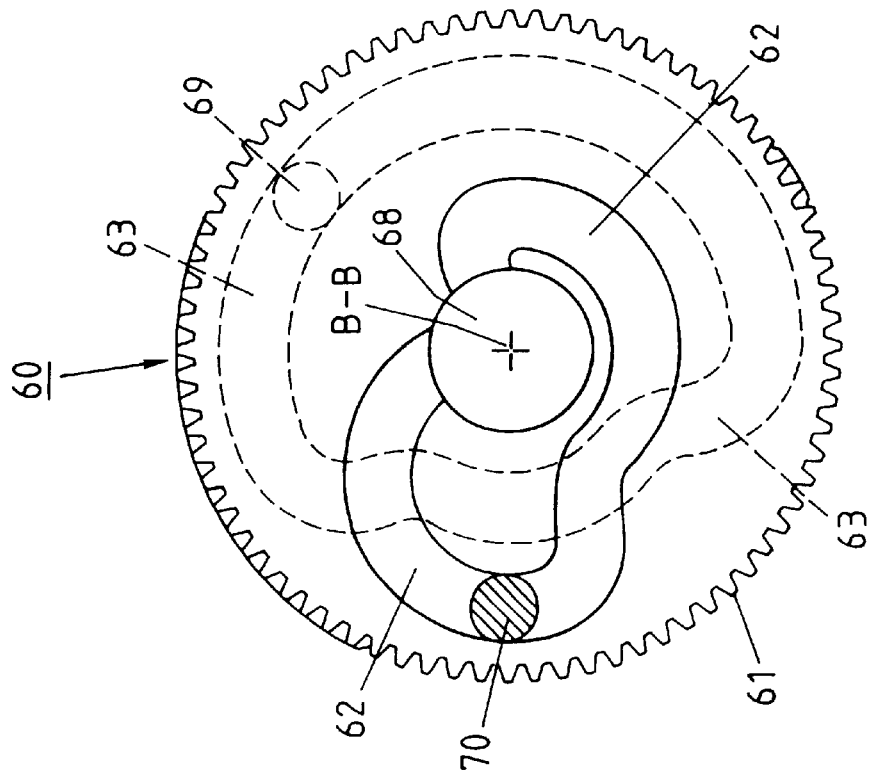
Figure 8A:
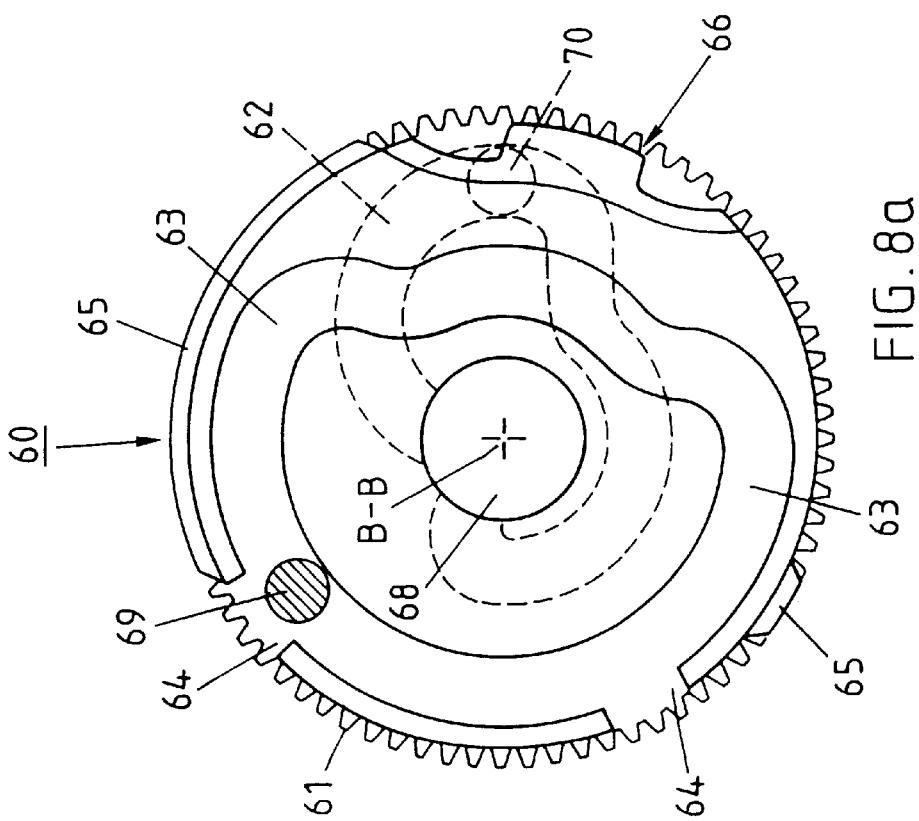

The practical implementation of the cam disc K is represented in FIGS. 8*a* and 8*b* as described below. The actual sequences of movements as a function of time t may be understood from FIGS. 7*a* and 7*b* in which the movements m and functions S listed below may be determined. The time t from O to Z corresponds to a complete operating cycle.

According to FIG. 7*a*:

| | |
|---|---|
| vm37 | movement m of the brewing head (vertical motion) |
| cm32 | movement in of the brewing block (circular motion) |
| sm36,37 | stroke movement of the straining/expelling plungers (stroke Motion) |

According to FIG. 7*b*, the following sequential control and switching functions S are allocated to the movement sequences according to FIG. 7*a*:

i initialization electronically, position and hot water
   ii selection of powder duct, small or large quantity
      (large quantity represented)
  iii selection of associated grinder
  iv grinding time - determines coffee quantity
   v route for a small quantity, short grinding time
  vi brewing valve from the boiler to the brewing chamber
 vii feed time of the water pump, quantity-recording
     using a flow meter
viii brewing operation in the brewing chamber with coffee delivery -continued ix  brewing valve set to outflow
    x   stroke movement displaces residual water into outflow
        (additional pressing)
    xi  coffee grounds are expelled and scraped off
    xii rotation back to the starting position, limit switches monitor The simplest translation of the kinematics into a mechanical control is achieved according to FIG. 8 by means of two cam discs, located opposite one another on the axis A—A, which are associated with a spur gear or gears 60 with teeth 61.

Located peripherally are recesses 64 which are used to move a driver 69 in and out, the driver being a component part of the brewing head 27 described earlier. The cam discs are realized by cam grooves 62 and 63, so that the driver pins 69 and 70 are guided on both sides.

Accordingly, the external cam groove 63 may be seen in FIG. 8a, while in FIG. 8b the internal cam groove 62 of the spur gear 60 appears as a solid line. In addition, switching bars 66 may he seen on the interior side of the spur gear 60 (FIG. 8a) which operate microswitches (not shown).

A central bearing bore 68 enables the spur gear 60 to turn around the axis B—B. The design and construction of the spur gears 60 is such that identical parts may be used on both sides of the brewing assembly in the cam disc housings 58 and 59. Cf. FIG. 4.

The implementation of the preferred embodiment described above is achieved using commercially available components and techniques, including the drive- and control means. Thus, for example, a windscreen wiper motor known from the motor vehicle industry may be used to drive the spur gears using a worm gear and a 24 V direct current motor. The other electromotive drives, apart from the coffee grinders, likewise have their known application in the vehicle industry. The controlling of the method sequence over time is effected with similarly conventional microprocessors and control- and switching elements.

A coffee-maker according to the invention is able, with a boiler output of 3 kW per hour, to prepare 200 cups of delicious coffee. Even higher serving outputs are possible if larger connection capacities are available and corresponding provisions are made for removing the coffee grounds.

The whole brewing assembly 1 can be pulled out of the coffee-maker on the guide rails 56, and is therefore extremely easy to maintain. When it is pulled out, the remaining components and units of the machine are also easily accessible, so that any repair and stoppage times can be kept to a minimum.

It is possible to reduce the overall height of the whole brewing assembly still further by means of special stepping motors and other drives used in combination with electronic servo controls, so that the function of the cam discs may be implemented through appropriate software.

The functions initiated in the embodiment by means of commercially available microswitches can also he achieved in a non-contact manner, producing technical advantages, particularly through software implementation.

A preferred version of a coffee grinder which can be incorporated into the coffee-maker described above in a particularly space-saving manner is described in detail in parallel patent application PCT/CH97/00106. Known coffee grinders may obviously also be used.

We claim:

1. A coffee machine comprising at least two cylindrical brewing chambers and a device for preparing and apportioning coffee powder, the brewing chambers each closable by means of an upper and a lower axially displaceable plunger and into which hot water may be introduced under pressure, characterized in that the brewing chambers (25, 26) are recessed in a brewing block (32) which, guided partially over a circular path around a horizontally arranged axis, may be swivelled into a first filling position, then into a second brewing position with a hot water feed and a coffee discharge and into a third compacted coffee grounds-expelling position.

2. A coffee machine according to claim 1, characterized in that the brewing block (32) is pivotally held between two laterally arranged flanges (46, 47) and in that the brewing block (32) has a partially cylindrical exterior shape which, in a region of the brewing chambers (25, 26), contains a flat surface (31) orthogonal to the walls thereof.

3. A coffee machine according to claim 2, characterized in that the two flanges (46, 47) are actuated by means of spur gears (60) non-positively connected to the outside thereof.

4. A coffee machine according to claim 3, characterized in that cam discs (62, 63) are associated with the spur gears (60), which move the brewing block (32) with its upper brewing plungers (29, 30) and wherein the cam discs additionally actuate a scraper mechanism (50) which scrapes off residues when compacted coffee grounds are expelled.

5. A coffee machine according to one of claims 1 to 3, characterized in that the plungers (29, 30, 36, 37) and a scraper (50) for removing residues when the compacted coffee grounds are expelled are operated electrically, electro-mechanically and/or fluid-mechanically.

6. A coffee machine according to one of claims 1 to 4, characterized in that at least two brewing chambers (25, 26) have different diameters and volumes are provided side-by-side in an axial direction.

7. A coffee machine according to claim 6, characterized in that two grinding mechanisms (17) are arranged above the brewing chambers (25, 26), and in that electric motors associated with the grinding mechanisms (18, 19) enclose an angle of between 180 and 30 degrees between them.

8. A coffee machine according to claim 7, characterized in that a controllable swivelling funnel (22) is provided above and between the brewing chambers (25, 26) for diverting a coffee powder supply.

9. A method for operating the coffee machine according to claim 1, characterized in that the brewing block (32) is swivelled in one direction around the axis from its starting position in the first filling position through 30 degrees to the second brewing position, from the brewing position through another 30 degrees to the third expelling position and is then turned back through 60 degrees in the opposite direction to its starting position.

10. A method according to claim 9, characterized in that, after the outflow of coffee in the second brewing position, the upper plunger is moved upwards until it has traveled out of the brewing chamber, and in that, in the expelling position, the lower plunger then moves to the top end of the brewing chamber and expels the compacted coffee grounds completely, and in that the lower plunger remains in an upper position at least during part of the rotation back into the first filling position and in that, during the part of the rotation back, a scraper lies on a flat surface of the brewing block.

* * * * *